United States Patent [19]

Koenig et al.

[11] Patent Number: 5,810,338
[45] Date of Patent: Sep. 22, 1998

[54] LONGITUDINALLY-DIVIDED TORSION BAR OPTIMIZED FOR WEIGHT AND STABILITY

[75] Inventors: Wolfhard Koenig, Stuttgart; Werner Moehrmann, Fellbach; Heinz-Peter Stiel, Lauffen, all of Germany

[73] Assignee: Mercedes-Benz AG, Germany

[21] Appl. No.: 838,811

[22] Filed: Apr. 10, 1997

Related U.S. Application Data

[63] Continuation of Ser. No. 669,638, Jun. 24, 1996, abandoned.

[30] Foreign Application Priority Data

Jun. 23, 1995 [DE] Germany ................ 195 22 898 .7

[51] Int. Cl.$^6$ ............................................ F16F 1/14
[52] U.S. Cl. .................... 267/273; 29/527.1; 72/369; 267/154
[58] Field of Search .................... 267/154, 156, 267/157, 273, 277, 278, 279, 285, 284, 274, 148, 149; 280/721, 717, 700, 723, 689, 695, 124.166, 124.167; 403/274, 206, 345; 29/890.53, 527.1, 527.2; 264/46.1; 148/572, 537, 320; 72/369

[56] References Cited

U.S. PATENT DOCUMENTS

| | | | |
|---|---|---|---|
| 1,823,158 | 9/1931 | Mogford et al. | 29/517 |
| 2,131,766 | 10/1938 | Temple, Jr. | 29/517 |
| 3,453,857 | 7/1969 | Reckard | 72/369 |
| 4,131,491 | 12/1978 | Joseph | 267/154 |
| 4,138,141 | 2/1979 | Andersen | 267/273 |
| 4,180,421 | 12/1979 | Joseph et al. | |
| 4,231,555 | 11/1980 | Saito | 267/154 |
| 4,322,062 | 3/1982 | Aleck | 267/154 |
| 4,622,086 | 11/1986 | Pück et al. | |
| 4,836,516 | 6/1989 | Wycech | 267/279 |
| 4,854,150 | 8/1989 | Brown et al. | |
| 4,869,480 | 9/1989 | Beutin et al. | 267/273 |
| 4,908,930 | 3/1990 | Wycech | 29/527.2 |
| 5,520,376 | 5/1996 | Langa et al. | 267/273 |
| 5,549,370 | 8/1996 | Folson | 267/154 |

FOREIGN PATENT DOCUMENTS

| | | | |
|---|---|---|---|
| 28 05 007 | 8/1979 | Germany . | |
| 28 46 445 | 4/1980 | Germany . | |
| 79 24 744 | 2/1981 | Germany . | |
| 37 42 869 | 6/1988 | Germany . | |
| 5642741 | 4/1981 | Japan | 267/273 |
| 6184428 | 4/1986 | Japan | 267/273 |

OTHER PUBLICATIONS

Sass, F. et al., "Taschenbuch fur den Maschinenbau", Dubbel, New York 1970.

*Primary Examiner*—Douglas C. Butler
*Attorney, Agent, or Firm*—Evenson, McKeown, Edwards & Lenahan, P.L.L.C.

[57] ABSTRACT

A torsion bar has a torsion bar arm and a torsion bar back connected thereto in one piece. Successive longitudinal sections are provided with different cross-sections. Consequently, a permissible maximal tension is not exceeded at any point and a relative weight optimum is achieved.

15 Claims, 1 Drawing Sheet

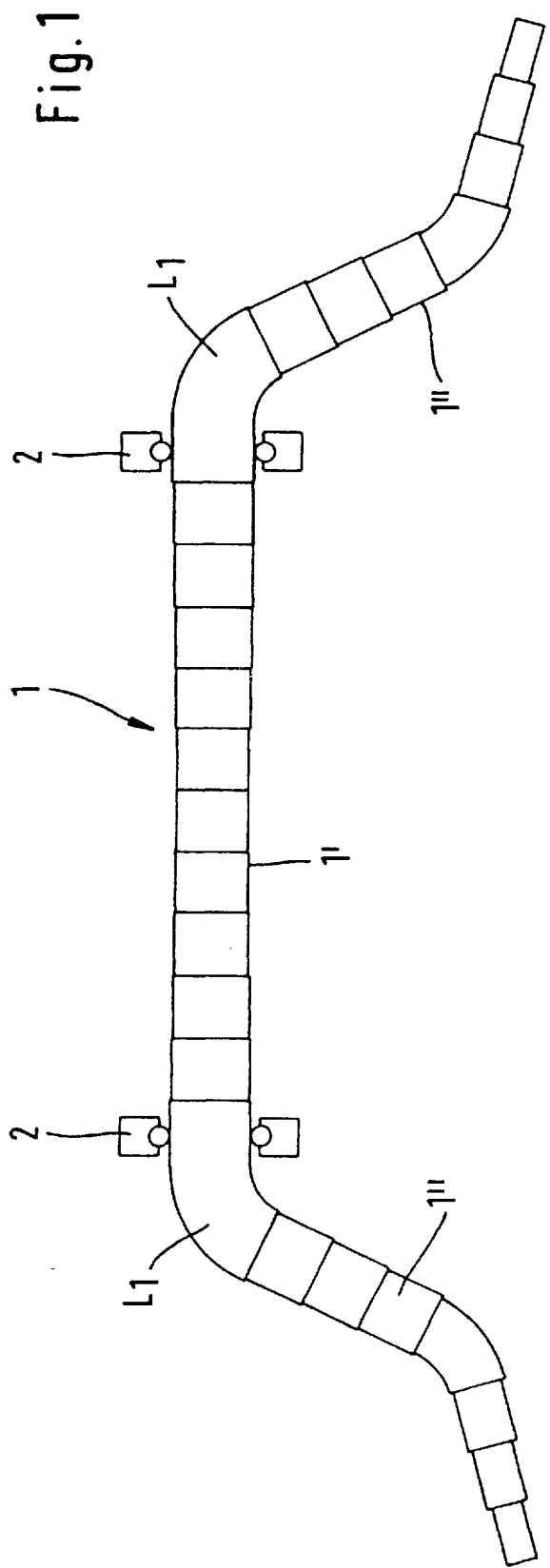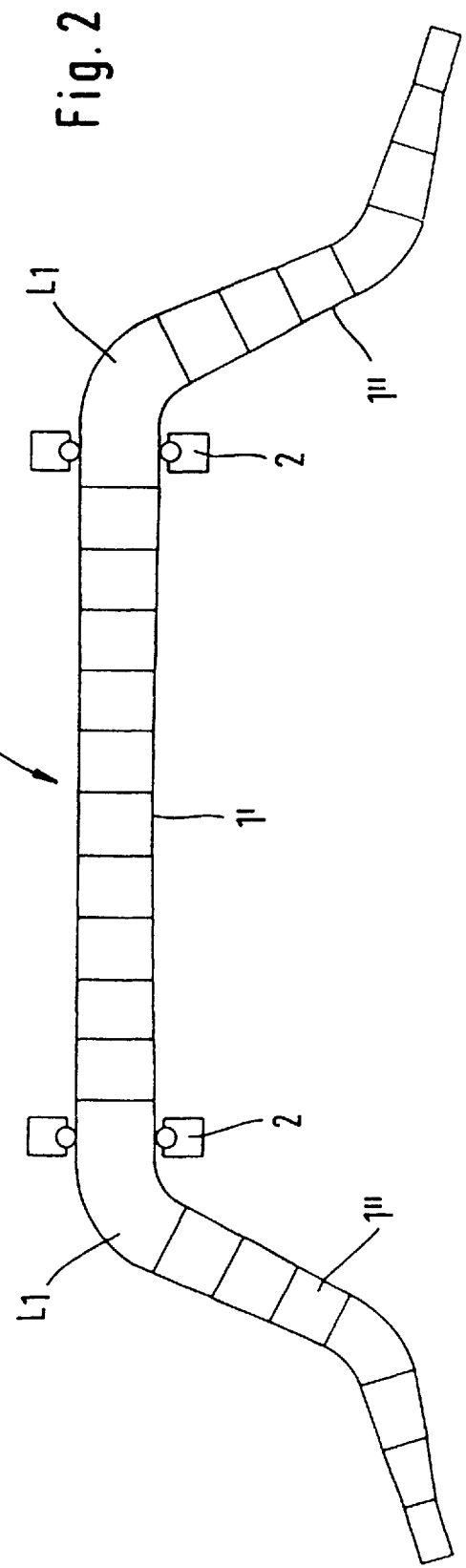

LONGITUDINALLY-DIVIDED TORSION BAR OPTIMIZED FOR WEIGHT AND STABILITY

This application is a continuation of application Ser. No. 08/669,638, filed on Jun. 24, 1996, now abandoned.

BACKGROUND AND SUMMARY OF THE INVENTION

The present invention relates to a torsion bar, such as a stabilizer for motor vehicles, and more particularly to a torsion bar having a torsion bar arm and a torsion bar back connected thereto in one piece as well as a reinforced transition area between the torsion bar arm and the torsion bar back configured such that, by application of force at predetermined points, by the arrangement is stressed with respect to torsion and/or bending.

DE-OS 28 05 007 and DE-OS 28 46 445 show known torsion bars constructed of a massive material or in a tube shape with a small cross-section. Reinforcements are provided in the transition area between the torsion bar back and the torsion bar arm in that the cross-section of the torsion bar or of the tube wall is enlarged there. In this manner, a good utilization of material is to be achieved while the weight is comparatively low.

If the torsion bar is constructed as a so-called stabilizer bar of a motor vehicle, the torsion bar back is arranged in the transverse direction of the vehicle and is provided on both ends with one torsion bar arm respectively. The torsion bar arms extend essentially in the longitudinal direction of the vehicle or have a component in the longitudinal direction of the vehicle. Close to the torsion bar arms, the torsion bar back is rotatably disposed on the chassis of the vehicle. The free ends of the torsion bar arms are connected with axle parts or suspension parts of the vehicle wheels of an axle.

An object of the invention is to provide a torsion bar which is optimized with respect to its weight and its stability.

According to the present invention, this object has been achieved in that the torsion bar can be divided into longitudinal sections at least in areas, which longitudinal sections, in the case of a virtual cross-sectional change have approximately equal values for the differential $d(1/c_i)/dV_i$ and/or have approximately equal values for the mathematical product $c_i V_i$, with $c_i$ being the proportional spring rate relative to the force application points and $V_i$ being the volume of the respective longitudinal section.

The present invention is based on the recognition that the torsion bar should be constructed in such a manner that the material housed within the outer layer of each longitudinal section is better utilized with respect to the spring rate of the torsion bar than the material which, in the case of a virtual cross-sectional enlargement of the respective longitudinal section, would be situated outside the outer layer of the actual cross-section of the longitudinal section. In the case of a torsion bar with a circular cross-section, the two first conditions are largely equivalent.

The number as well as possibly different lengths of the longitudinal sections may be predetermined while taking into account additional requirements. For example, with a view to a simplified manufacturing, it could be predetermined that, within a certain longitudinal section, a cross-section should exist which is predetermined, for example, by torsion bar bearings. Outside this longitudinal section there should exist only a predetermined small number of longitudinal sections with different cross-sections.

According to a first embodiment of the present invention, each longitudinal section can be constructed with a uniform cross-section so that adjacent longitudinal sections adjoin one another while forming a circumferential step.

Instead, it is also within the scope of the present invention to construct the longitudinal sections between neighboring sections with different cross-sections conically or in a similar manner such that the above-mentioned circumferential steps are avoided. The optimal conical form is reached in this situation when the torsion bar is subdivided into very many and correspondingly short longitudinal sections to which the above-mentioned conditions apply.

In a tube-shaped torsion bar, it is advantageous from a manufacturing perspective to produce the desired shape in that a tube, which is used for forming the torsion bar and whose longitudinal axis already largely has the shape of the longitudinal axis of the desired torsion bar, is placed into a negative mold and is then, by way of both tube ends, acted upon in the interior by a hydraulic pressure of a magnitude of from 2,000 to 3,000 bar, in which case the tube is, at the same time, axially set. As a result, the tube, while being irreversibly deformed, will mold itself onto the negative mold by way of which, in the case of a corresponding development, basically arbitrary cross-sectional courses of the torsion bar may be predetermined.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a schematic view of a torsion bar according to a first embodiment having respective longitudinal sections with uniform cross-sections; and FIG. 2 is a view of another embodiment of the present invention in which the longitudinal sections have a conical shape.

DETAILED DESCRIPTION OF THE DRAWINGS

The torsion bar 1 shown in FIG. 1 has a torsion bar back 1', which is rotatably disposed in pivot bearings 2 in a generally known manner on a chassis (not shown) or on parts of a motor vehicle connected thereto, as well as torsion bar arms 1", which adjoin the torsion bar back 1' in one piece and are connected on their free ends with wheel suspension part, (also not shown) for vehicle wheels arranged on the vehicle in a known vertically movable manner. When the wheels carry out different vertical lifts or move relative to the vehicle body in mutually opposite directions, the torsion bar arms 1" are angled relative to one another in an axial view of the torsion bar back 1', in which event the entire torsion bar 1 is stressed with respect to torsion as well as with respect to bending.

In the present invention, the torsion bar 1 is divided into a plurality of longitudinal sections which are designated herein as $L_i$, whereby the subscript i represents different numbers for different longitudinal sections. As illustrated in FIG. 1, these longitudinal sections $L_i$ have different cross-sections, in which case, for example, the cross-sections of the longitudinal sections $L_i$ in the area of the pivot bearings 2 may be predetermined by the dimensioning of the pivot bearings.

In the event of different vertical lifts of the wheels, that is, different swivel movements of the torsion bar arms 1", all longitudinal sections $L_i$ are elastically deformed, i.e. twisted and/or bent. Thereby, a spring rate $c_i$ can be assigned to each longitudinal section $L_i$ for the resulting deformation which reflects the ratio between the extent of the deformation and the forces causing the deformation on the respect longitudinal section $L_i$. The sum of the reciprocal values $1/c_i$ of the spring rates of all longitudinal sections $L_i$ forms the reciprocal value $1/c$ of the overall spring rate of the torsion bar 1.

The respective value $c_i$ of each longitudinal section $L_i$ depend not only on its length and cross-section but also on its position in the torsion bar 1, the shape of the torsion bar 1, the arrangement of its bearings 2, and the connections with the wheel suspension parts. The respective values $c_i$ therefore refer to a predetermined shape of the torsion bar 1 as well as to force application points predetermined by the bearings 2 and the arrangement of the connections with respect to the wheel suspension parts.

The cross-sections of the different longitudinal sections $L_i$ are first predetermined such that the differentials d $(1/c_i)/dV_i$ of all longitudinal sections $L_i$, in the case of a virtual cross-sectional change, have at least approximately the same values. That is, the torsion bar 1 has a relative weight optimum. Specifically, if one of the longitudinal sections $L_i$ were constructed with an enlarged cross-section and, instead, another of the longitudinal sections $L_i$ were provided with a reduced cross-section so that the overall spring rate of the torsion bar 1 remains unchanged, the weight of the torsion bar is increased. The values $dV_i$ can be depicted as hollow cylinders whose length corresponds to the length of the respective section $L_i$ and whose wall thickness is "infinitely" small.

In the following description, a dimensioning control will be carried out. A tolerable tension is predetermined first which must not be exceeded in any of the longitudinal sections $L_i$ when the torsion bar deforms maximally, as it is permitted because of its constructive arrangement and configuration. Then, those cross-sections are determined for the longitudinal sections $L_i$ in the event of which all longitudinal sections $L_i$, when there is a maximal deformation of the torsion bar 1, have approximately the same predetermined maximal value of the tension. Should it now be found that, in this determination of the cross-sections, the cross-section of one of the longitudinal sections $L_i$ is larger than in the case of the first described determination of the cross-sections, the cross-section of this latter longitudinal section is increased to the latter value.

Then, after the first determination process, another calculation of the cross-sections of the other longitudinal sections takes place, specifically such that the overall spring rate of the torsion bar 1 has the desired value.

Optionally, the above-mentioned calculations are repeated several times in order to ensure that, on one hand, the permissible maximal tension is not exceeded at any point of the torsion bar 1 and, on the other hand, a relative weight optimum exists.

With concessions to the achievable minimal weight, a torsion bar of the predetermined spring rate with the same maximal tension in each of the selected longitudinal sections can also be obtained. Then, the tension value which occurs at otherwise given conditions is the lowest one possible. In this manner, a reasonably priced material with lower permissible stress values can be used.

According to FIG. 2, the longitudinal sections $L_i$ may also each have a conical construction, in which case the cross-section in an axially central area of a conical section will then, in each case, correspond to the cross-section of the corresponding longitudinal section of FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A torsion bar adapted to serve as a stabilizer for a motor vehicle, comprising a torsion bar arm and a torsion bar back integrally connected thereto a reinforced transition area between the torsion bar arm and the torsion bar back and, in one of a predetermined arrangement and a predeterminable arrangement, by introduction of force at force application points constructively predetermined by the arrangement, is stressed with respect to at least one of torsion and bending, wherein the torsion bar, at least in preselected areas, is dividable into longitudinal sections which, with a change in defined cross-sectional configuration, have approximately equal values for the cross-sectional configuration whose change is at least one of a differential, $d(1/C_i)/dV_i$, and a mathematical product, $c_iVi$, whereby $c_i$ is a proportional spring rate related to force application points and $V_i$ is a volume of respective one of the longitudinal sections.

2. The torsion bar according to claim 1, wherein the longitudinal sections have equal lengths.

3. The torsion bar according to claim 1, wherein the torsion bar is tube-shaped.

4. The torsion bar according to claim 3, wherein the longitudinal sections have equal lengths.

5. The torsion bar according to claim 1, wherein, within the longitudinal sections, the torsion bar has a uniform cross-section which changes in a step-shape at the transition to an adjacent one of the longitudinal sections.

6. The torsion bar according to claim 5, wherein the longitudinal sections have equal lengths.

7. The torsion bar according to claim 6, wherein the torsion bar is tube-shaped.

8. The torsion bar according to claim 1, wherein the longitudinal sections arranged between neighboring sections with different cross-sections have a cone-type construction and a continuous transition to the neighboring sections.

9. The torsion bar according to claim 1, wherein the cross-sections of the longitudinal sections have continuous cross-sections at least in preselected areas.

10. The torsion bar according to claim 9, wherein the longitudinal sections have equal lengths.

11. The torsion bar according to claim 10, wherein the torsion bar is tube-shaped.

12. The torsion bar according to claim 11, wherein, within the longitudinal sections, the torsion bar has a uniform cross-section which changes in a step-shape at the transition to an adjacent one of the longitudinal sections.

13. The torsion bar according to claim 1, wherein the longitudinal sections, at least in preselected areas, are provided in a very large number and with a minimum length.

14. The torsion bar according to claim 1, wherein a curved transition area is operatively arranged to adjoin the torsion bar back and the torsion bar arm.

15. A process for manufacturing a tube-shaped torsion bar adapted to serve as a stabilizer for a motor vehicle, comprising the steps of integrally connecting a torsion bar arm and a torsion bar back as well as a reinforced transition area between the torsion bar arm and the torsion bar back and, introducing a force in one of a predetermined arrangement and a predeterminable arrangement, at force application points constructively predetermined by the arrangement, stressing the torsion bar with respect to at least one of torsion and bending, and dividing the torsion bar, at least in preselected areas, into longitudinal sections which, with a change of cross-sectional configuration, have approximately equal values for the cross-sectional configuration whose change is at least one of a differential, $d(1/C_i)/dV_i$, and a mathematical product, $c_iV_i$, whereby $c_i$ is a proportional spring rate related to force application points and $V_i$ is a volume of a respective one of the longitudinal sections, wherein a tube is placed in a negative mold and the tube is widened by the hydraulic admission of pressure into an interior thereof by simultaneous setting of ends thereof while molding the tube against the negative mold to form the torsion bar.

* * * * *